United States Patent Office 3,113,855
Patented Dec. 10, 1963

3,113,855
METHOD OF INCREASING ANNEALING POINT OF HIGH SILICA GLASS
Thomas H. Elmer, Corning, N.Y., assignor to Corning Glass Works, Corning, N.Y., a corporation of New York
No Drawing. Filed June 27, 1960, Ser. No. 38,747
4 Claims. (Cl. 65—31)

This invention relates to glasses of the types disclosed in Patents Nos. 2,106,744 and 2,221,709, and particularly to a method of improving the properties and usefulness of such glasses for applications wherein the glasses are subjected to high temperatures during use.

According to such patents, an article composed of a glass containing over 94% silica can be produced by melting and shaping a particularly easily meltable borosilicate glass, heat treating the glass to cause it to phase separate, and extracting therefrom the soluble, non-siliceous constituents of one phase by leaching to leave a highly siliceous structure of the other phases retaining its original shape and having a multiplicity of inner communicating submicroscopic pores, and thereafter consolidating the porous glass to a non-porous condition by heating. As such glasses can be formed to a variety of shapes by glass-working techniques and have high annealing points (of the order of about 900°–1025° C.) and good transmittance to visible and UV light, they have been utilized as envelopes for medium-pressure, mercury arc lamps. However, their use for these and related applications have been limited by the maximum annealing point attainable therein.

The principal object of this invention is to produce glass articles which have annealing points in excess of 1100° C., preferably in excess of 1150° C., from glass compositions which may be melted and worked by conventional procedures into the articles of the desired shape.

I have now discovered that the principal object can be achieved by an improvement in the heretofore known methods of producing glass articles disclosed in the above-mentioned patents; such products being known in the trade by the generic name of "96% silica glass." My improved method comprises subjecting a body or article of such glass in the porous condition, produced by the known method of exposing suitable glass compositions to an emulsion-forming heat-treatment and thereafter dissolving the soluble phase of the glass in acid solutions, to a temperature between about 750° and 1050° C. for a time of at least about 1 hour, releaching the thus heat-treated porous glass in acid leaching solutions, and thereafter heating the glass to dry it and thence heating it at a temperature of about 1300°–1350° C. for a sufficient time to consolidate it to the non-porous condition. My above described process produces a glass body with an annealing point of at least 1100° C. and a $B_2O_3$ content of less than about 1.5%, whereas the annealing points of the glass bodies produced by the methods of the aforementioned patents are about 900°–1025° C. and they contain about 3.0% $B_2O_3$. The above described heat treatment is an essential feature of my method as merely subjecting the porous glass to further leaching without such heat treatment does not produce any discernible increase in the annealing point or lowering of the $B_2O_3$-content of the final glass. Furthermore, the heat-treatment must be carried out within the prescribed ranges as heat treatments below about 750° C. are not effective for producing the desired result whereas treatments in excess of about 1050° C. cause the porous glass to commence to consolidate.

In practicing my invention, the article used as initial stock material in my improved process is fabricated in the usual manner from a glass consisting essentially of $SiO_2$, $B_2O_3$, and alkali oxide; the amount of each being governed by considerations set forth in the above-mentioned patents. In these glasses alumina may be present in small amounts and its presence in amounts up to 4% in glasses of low silica content located near the center of the field defined in such patents is advantageous in facilitating the subsequent leaching of the glass.

The article is subjected to a heat treatment which comprises heating the glass at a temperature between about 525° and 600° C. for a time necessary to cause the required change in structure. As a result of the heat treatment, the glass will become more or less completely separated or formed into two phases one of which is very rich in boric oxide and alkali metal oxide and is soluble in acids and the other of which is very rich in silica and is substantially insoluble in acids. In other words, a change has taken place in the structure of the glass so that the constituents other than silica are for the most part soluble in acids and may be extracted thereby.

The previous thermal history of a glass has a bearing upon the heat treatment which may be required for best results. Articles which are relatively thick receive some heat treatment in normal working and cooling and the additional heat treatment required may be different from that required by a thinner article which was cooled more quickly during manufacture. Hence the term "heat treatment" as used herein includes heat treatment during fabrication as well as any additional heat treatment following fabrication.

In order that the leaching step may be carried out with better facility, it is desirable to etch off the surface of the glass by immersing it for a few minutes in a dilute solution of hydrofluoric acid or in a hot 5% solution of sodium hydroxide.

The article is then rinsed and immersed in dilute hydrochloric, nitric, or sulfuric acid, the temperature of the bath being held preferably at or near its boiling point to obtain maximum speed of extraction. The progress of the extraction may be observed because the interface between the extracted and unextracted portions of the glass is visible.

After the acid treatment, the glass is washed to remove all traces of the soluble constituents which have been acted on by the acid. This is best accomplished by immersing the glass for several hours in hot, acidified water so as to expose all sides of the article to the washing action. The removal of the soluble phase leaves the silica phase as rigid structure possessing the original shape of the article, but submicroscopically porous, the pores being filled with water. The article may thereafter be dried and in general will be substantially transparent, probably because the individual pores are too small to reflect light. Articles thus produced in which the pore size is sufficiently large will have light diffusing characteristics.

While I am unable to prove the reasons that my improved method reduces the $B_2O_3$ content of the glass, I believe that the heat treatment loosens the porous glass structure thereby enabling additional $B_2O_3$ to be leached out by the leach solution. The fact that the resultant glass contains an appreciably lower percentage of $B_2O_3$ is a possible explanation of the higher annealing point.

The heat treatment can be performed in any conventional furnace such as a gas fired furnace or an electrical-resistance type furnace. Furthermore, it is immaterial what type of atmosphere is present in the furnace during the heat treatment as satisfactory results have been achieved utilizing air, vacuum, or ammonia atmospheres during the heat treatment operation.

The re-leaching can be carried out in the manner described in the above-mentioned prior patents utilizing any of the acid baths, such as three normal hydrochloric acid or five normal sulfuric acid, at a temperature of about 98° C. However, the rate of leaching of the porous glass is substantially greater than for the unleached glass of the prior method and can be substantially completed in about 1 hour for each millimeter of thickness of the body being treated, but longer treatments are of course not detrimental to the body.

The subsequent consolidation of the re-leached porous glass can be accomplished by the prior methods of heating in air or in a vacuum but the temperature must be at least 1300° C. in order to achieve complete consolidation of the body to a non-porous condition. Furthermore, the porous glass may be subjected to an additional treatment in a controlled atmosphere, such as hydrogen or forming gas, at elevated temperatures prior to consolidation as is known in the art or in ammonia-containing atmosphere at a temperature of 900°–1050° C. prior to consolidation as disclosed in another copending application Serial No. 38,746, filed by me of even date herewith.

The preferred method of treating such porous glass bodies according to my method is illustrated by the following example.

A porous glass article having been once heat treated and thereafter leached in an acid solution according to the methods of the above-mentioned prior patents and containing about 3% by weight $B_2O_3$ is placed in a conventional furnace and heated to a temperature of 900° C. Heat should be applied with sufficient slowness for the first 300° C. so that the article may not be shattered by a too sudden evolution of water. The furnace temperature is thereupon maintained at 900° C. for 16 hours. The article is then allowed to cool to room temperature either in the furnace or by removing it therefrom upon completion of the heat treatment. The porous glass body is then placed in a 1.5 normal hydrochloric acid solution, maintained at a temperature of 98° C., for 1 hour for each millimeter of thickness of the glass body being treated. The releached body is then again placed in a furnace and heated to a temperature of 1300° C. with appropriate holds or soaking times of ½ hour at 900° C. and 1 hour at 950° C., 1000° C., and at 1050° C. The article thus produced has an annealing point of about 1100° C. and consists essentially by weight of 98.5% $SiO_2$, 1.0% $B_2O_3$, 0.5% $R_2O_3$, and less than 0.01% $R_2O$.

If, in addition to the high annealing point obtained by the above method, it is also desirable to produce a body with good transmittance in the infrared portion of the radiation spectrum, it is desirable to carry out the heat treatment prior to releaching in an atmosphere of ammonia gas thereby producing a body with only about 0.4% $B_2O_3$ and an annealing point of about 1130° C.

In the event that it is desirable to obtain the highest annealing point possible, the releached porous glass body can be subsequently heat treated, before consolidation, in an ammonia atmosphere and consolidated in a non-oxidizing atmosphere, according to the method disclosed in another application, Serial No. 38,746, filed by me of even date herewith.

What is claimed is:

1. The method of improving the annealing point of a 96% silica glass article made by the consolidation of a high silica glass article containing throughout its mass a plurality of intercommunicating submicroscopic pores which includes heating the porous glass body at a temperature of 750°–1050° C. for at least 1 hour, leaching the thus heat-treated porous glass body in an acid leach bath and thereafter consolidating the releached porous glass body at a temperature of 1300°–1350° C.

2. The method of claim 1 in which the body of porous glass is heat-treated in an ammonia-containing atmosphere.

3. In the method of making a 96% silica glass article which comprises melting and shaping a borosilicate glass, heat-treating the glass to cause it to phase separate and extracting therefrom soluble, non-siliceous constituents of one phase by leaching to leave a highly siliceous structure retaining its original shape and having a multiplicity of intercommunicating submicroscopic pores and thereafter consolidating the porous glass to a non-porous condition by heating, the improvement which comprises heat-treating the porous glass at a temperature of 750°–1050° C. for at least 1 hour, leaching the thus heat-treated porous glass body in an acid leach bath, and thereafter consolidating the releached porous glass body at a temperature of 1300°–1350° C.

4. The method of claim 3 in which the body of porous glass is heat-treated in an ammonia-containing atmosphere.

References Cited in the file of this patent

UNITED STATES PATENTS

| | | |
|---|---|---|
| 2,215,039 | Hood et al. | Sept. 17, 1940 |
| 2,286,275 | Hood et al. | June 16, 1942 |
| 2,303,756 | Norberg | Dec. 1, 1942 |